United States Patent [19]

Bluett

[11] Patent Number: 4,552,481

[45] Date of Patent: Nov. 12, 1985

[54] ENVIRONMENTAL IMPERVIOUS SWIVEL

[76] Inventor: Thomas J. Bluett, 4 Cordell Pl., East Northport, N.Y. 11731

[21] Appl. No.: 633,485

[22] Filed: Jul. 23, 1984

[51] Int. Cl.[4] ............................................... F16D 1/12
[52] U.S. Cl. ..................................... 403/165; 403/78; 59/95
[58] Field of Search ................. 403/78, 164, 165, 371; 59/95, 9

[56] References Cited

U.S. PATENT DOCUMENTS

| | | | |
|---|---|---|---|
| 2,387,599 | 10/1945 | Miller et al. | 403/165 |
| 2,740,000 | 3/1956 | Wierk | 403/165 |
| 3,009,747 | 11/1961 | Pitzer | 403/371 X |
| 3,275,338 | 9/1966 | Herbenar et al. | 403/165 X |
| 3,820,801 | 6/1974 | Lindler | 403/371 X |
| 3,836,268 | 9/1974 | Behnke | 403/165 |
| 4,308,419 | 12/1981 | Fredriksson | 403/78 X |

*Primary Examiner*—Andrew V. Kundrat
*Attorney, Agent, or Firm*—Richard L. Miller

[57] ABSTRACT

An environmental impervious swivel which provides a low friction bearing surface while retarding the ingress of any environmental contaminants. One bearing surface is formed typically polytetrafluoroethylene (PTFE). The connecting members may be eyes, threaded shafts or any other fastener type desired. The swivel is constructed of two major components, namely a cylinder connected by a shank to a connecting member, and a piston connected by another shank to another connecting member. The swivel is assembled by placing a (PTFE) split bushing over the piston shank, inserting the piston into the cylinder and rolling over the open end of the cylinder.

6 Claims, 3 Drawing Figures

ENVIRONMENTAL IMPERVIOUS SWIVEL

BACKGROUND OF THE INVENTION

The present invention relates generally to mechanical hardware used under environmentally stressful conditions and, more specifically to swivels which are environmentally impervious.

While there are a number of swivels well known in the art such as U.S. Pat. Nos. 2,400,291, by D'Aleo; 2,466,243, by Johnson; and 3,504,937 to Panovic, none of these are constructed to resist the corrosive environmental condition such as those occurring in for a swivel operating in a salt water environment, a high dust situation or submersed in mud and sand, as is the instant invention.

Swivel joints require that two masses rotate axially with respect to one another with the least possible energy loss due to friction. A number of techniques may be applied to reduce the coefficient of friction between the rotating masses along their rotating surfaces. Wet and dry lubricants may be used or the rotating surfaces themselves may be fabricated from plastics having low coefficients of friction, such as, polytetrafluoroethylene (PTFE) which, is manufactured by Dupont, Inc. under the trademark TEFLON ®.

However, regardless of the nature of the lubricant or the sliding surfaces, contaminants containing particulates may enter the swivel assembly and increase friction, requiring excess swiveling force and reducing the life span of the swivel itself.

SUMMARY OF THE INVENTION

It is, therefore, a primary object of the present invention to provide an environmental impervious swivel with a very low coefficient of friction between the rotating surfaces.

Another object of the present invention is to provide an environmental impervious swivel in which environmental contaminants are retarded from entering the swivel assembly.

A yet further object of the present invention is to provide an environmental impervious swivel in which the connecting members may be of any sort, including eyes, threaded shafts, etc.

Another yet further object of the present invention is to provide an environmental impervious swivel which may be scaled up or down to any size.

A still further object of the present invention is to provide an environmental impervious swivel which is simple and inexpensive to fabricate.

A yet still further object of the present invention is to provide a swivel mechanism which even when contaminated with many undesirable substances will continue to operate without any appreciable degradation.

Further objects of the present invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
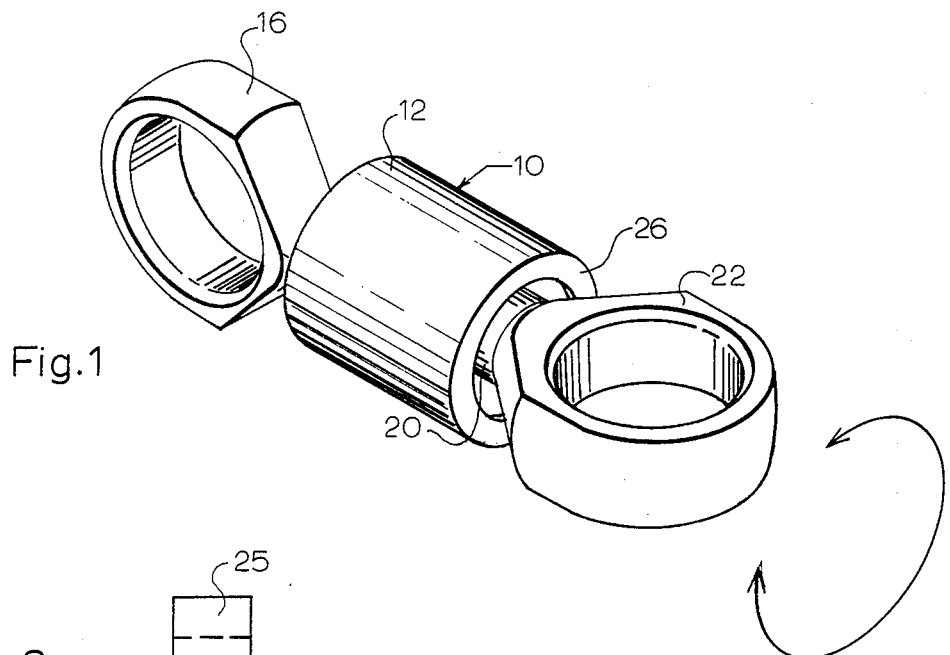
FIG. 1 is a isometric view of the invention.
Figure 2:
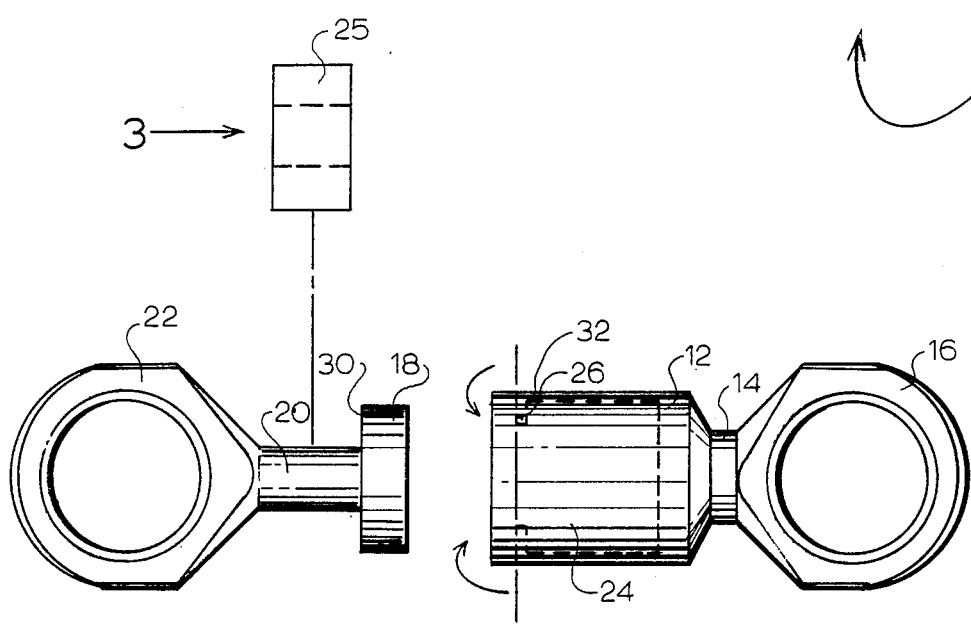
FIG. 2 is an exploded side view of the invention.
Figure 3:
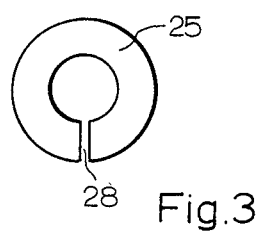
FIG. 3 is a view taken, in the direction of arrow 3 in FIG. 2, of only the split cylindrical bushing so as to clarify construction details.

Swivel 10 is made of two principal components, namely, a cylinder 12 connected by a shank 14 to an eye 16, and a cylindrical piston 18 connected by a shank 20 to an eye 22. The outer diameter of the piston 18 is slightly smaller than the inner diameter of a chamber 24 so that the piston 18 may swivel clockwise or counter-clockwise. All of these components are made of a strong rigid material such as brass or stainless steel.

A split cylindrical bushing 25 with a split 28 is placed over the shank 20 by spreading split cylindrical bushing 25 and inserting it onto the shank 20. The resiliency of the split cylindrical bushing 25 then returns it to its original cylindrical shape. In order to assure a very low coefficient of friction, the split cylindrical bushing is typically made of polytetrafluoroethylene (PTFE).

After the split cylindrical bushing 26 has been installed, the complete swivel assembly 10 is fabricated by inserting the piston 18 into the chamber 24 and then rolling over the open end of the cylinder 12 to form a rolled over end 26 which secures the entire assembly 10. The relative dimensions of the chamber 24, the cylindrical piston 18, and split cylindrical bushing 25 are such that very little lateral axial motion of the piston 18 inside chamber 24 is permitted. The very close fit between outer surface 30 of the piston 18 and inner surface 32 of the rolled over end 26 tends to prevent the entrance of any contaminants while providing low friction contact surfaces. However it is to be noted that by using TEFLON ®, or other similar plastics for the bushing material causes the instant invention to be quite impervious to a large variety of every day ordinary contaminants, such as salt water, sand, mud, dust and the like.

When the bushing 26 is correctly sized to with stand required axially tension loads contaminate substances which normally would cause havoc were the bushing not present and metal to metal contact were relied upon are of trivial consequence. Even when the metal components are of such a nature that a fair amount of surface corrosion takes place, as is the case if brass is used in a salt water environment the swivel action is at best only trivially degraded and the swivel operates quite well until its structure physically fractures from the combination of mechanical stress and chemical deterioration of the shanks 14, 20 or the eyes 16, 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An environmental impervious swivel, comprising:
   (a) a cylinder connected by a first shank to a first connecting member;

(b) a cylindrical piston connected by a second shank to a second connecting member, said piston being inserted coaxially into said cylinder so that said piston can swivel inside said cylinder;

(c) a cylindrical bushing disposed coaxially around said second shank and having an outer diameter equal to the outer diameter of said piston and having a relatively close fit to the inner diameter of the cylinder;

(d) means for inserting said cylindrical bushing over said second shank; and (e) means for preventing said cylindrical piston from pulling free of said cylinder when an axial force is applied including a cylinder with an open end rolled over to form a flat front face and having an inner diameter so that said inner diameter of said rolled over end is less than an outer diameter of said cylindrical bushing and said cylindrical piston, the length of the bushing and piston approximating the cylinder length until the rolled over end so as to permanently secure said cylindrical piston within said cylinder and simultaneously also retard the entrance of any environmental contaminant while permitting low friction swiveling.

2. The environmental impervious swivel as recited in claim 1, wherein said first connecting member is an eye.

3. The environmental impervious swivel as recited in claim 1, wherein said second connecting member is an eye.

4. The environmental impervious swivel, as recited in claim 1, wherein said means for inserting said cylindrical bushing over said second shank includes a split formed in said cylindrical bushing which is spread in order to allow said bushing to be placed upon said second shank wherein the resiliency of said split cylindrical bushing returns said split cylindrical bushing to its original cylindrical shape.

5. The environmental impervious swivel, as recited in claim 4, wherein said cylindrical split bushing is fabricated from a plastic with a low coefficient of friction.

6. The environmental impervious swivel, as recited in claim 4, wherein said plastic with a low coefficient of friction is polytetrafluoroethylene.

* * * * *